(12) United States Patent
Yagi et al.

(10) Patent No.: US 6,844,113 B2
(45) Date of Patent: Jan. 18, 2005

(54) ELECTRODE FOR LITHIUM SECONDARY BATTERY AND METHOD FOR PRODUCING THE SAME

(75) Inventors: Hiromasa Yagi, Nishinomiya (JP); Hisaki Tarui, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 282 days.

(21) Appl. No.: 10/119,682

(22) Filed: Apr. 11, 2002

(65) Prior Publication Data

US 2002/0177044 A1 Nov. 28, 2002

(30) Foreign Application Priority Data

Apr. 13, 2001 (JP) ........................................ 2001-115465

(51) Int. Cl.[7] ............................ H01M 4/72; B23P 13/00
(52) U.S. Cl. .................. 429/234; 429/233; 429/231.95; 429/209; 29/2
(58) Field of Search ............................ 429/231.95, 233, 429/234, 209; 29/2

(56) References Cited

U.S. PATENT DOCUMENTS

2002/0048705 A1 * 4/2002 Park et al. .............. 429/231.95

FOREIGN PATENT DOCUMENTS

| JP | 2001-283833 A | 10/2001 |
| JP | 2001-283834 A | 10/2001 |
| WO | 99/49532 A1 | 9/1999 |
| WO | 00/03444 A1 | 1/2000 |

OTHER PUBLICATIONS

Beaulieu, L. Y. et al., "Colossal Reversible Volume Changes in Lithium Alloys", *Electrochemical and Solid–States Letter*, 4(9), pp. A137–A140, 2001.

* cited by examiner

*Primary Examiner*—Laura Weiner
(74) *Attorney, Agent, or Firm*—Kubovcik & Kubovcik

(57) ABSTRACT

The electrode for a lithium secondary battery includes: a current collector; an interlayer containing Mo or W provided on the current collector; and a thin film composed of active material capable of lithium storage and release deposited on the interlayer.

11 Claims, 4 Drawing Sheets

×2,000

×10,000

×2,000

×10,000

×2,000

×10,000

ELECTRODE FOR LITHIUM SECONDARY BATTERY AND METHOD FOR PRODUCING THE SAME

BACKGROUND OF THE INVENTION

1. Field of the Invention

The present invention relates to an electrode for a lithium secondary battery and a method for producing the same.

2. Related Art

In recent years, development of lithium secondary batteries has been actively made. The battery properties of a lithium secondary battery, such as the charge-discharge voltages, the charge-discharge cycle life characteristics and the storage property, are greatly influenced by the electrode active material used.

Among electrode active materials capable of lithium storage and release, silicon which is a material storing lithium by being alloyed with lithium, has been examined in various aspects because it has a large theoretical capacity. However, since silicon stores lithium by forming an alloy with lithium, the volume greatly expands and shrinks with charge and discharge. This causes problems such as pulverization of the active material and separation of the material from a current collector, and thus deteriorates the charge-discharge cycle characteristics. For this reason, use of silicon has not yet been commercialized.

Electrodes for lithium secondary batteries using silicon and the like as an electrode active material and yet exhibiting a good charge-discharge cycle characteristics have been proposed (International Publication No. WO 0/31720A1), in which a microcrystalline or amorphous thin film is formed on a current collector by a thin film formation method such as a CVD method, a sputtering method and a vapor evaporation method. In such electrodes for lithium secondary batteries, the adhesion between the thin film and the current collector is good because a component of the current collector diffuses into the active material thin film appropriately, and this improves the charge-discharge cycle characteristics. For example, when a thin film made of silicon or germanium is formed on a current collector containing copper, the copper diffuses into the silicon or germanium, improving the adhesion between the thin film and the current collector.

However, since the diffusion coefficient of copper in silicon or germanium is significantly large, an excessive amount of the current collector component may diffuse in the thin film forming an alloy depending on the thin film formation conditions and the type of the current collector used. In such a case, the charge-discharge cycle characteristics may be deteriorated.

SUMMARY OF THE INVENTION

An object of the present invention is to provide an electrode for a lithium secondary battery capable of controlling diffusion of a current collector component and exhibiting an excellent charge-discharge cycle characteristics, and a method for producing the same.

The electrode for a lithium secondary battery of the present invention includes: a current collector; an interlayer containing Mo or W provided on the current collector; and a thin film composed of active material capable of lithium storage and release deposited on the interlayer.

According to the present invention, an interlayer containing Mo or W is provided between the current collector and the thin film of active material. With providing the interlayer, it is possible to suppress diffusion of a current collector component into the thin film appropriately, and thus prevent generation of an adverse effect due to excessive diffusion of the current collector component.

The component of the interlayer is not limited to Mo and W, but substantially the same effect can be obtained by use of at least one kind of metal selected from the group consisting of magnesium (Mg), aluminum (Al), titanium (Ti), vanadium (V), chromium (Cr), manganese (Mn), iron (Fe), cobalt (Co), nickel (Ni), zinc (Zn), germanium (Ge), zirconium (Zr), niobium (Nb), molybdenum (Mo), ruthenium (Ru), silver (Ag), indium (In), tin (Sn), antimony (Sb), tantalum (Ta), tungsten (W) and lead (Pb), an alloy containing at least one kind of metal selected from the above group as a main component, or an oxide, nitride or carbide of any kind of metal selected from the above group.

According to the present invention, the thickness of the interlayer is preferably 0.01 to 1 $\mu$m. When a thin interlayer is formed, it does not necessarily cover the entire current collector, but may exist like islands on the current collector. The thickness of the interlayer as used herein is that obtained when the interlayer is deposited on a flat substrate surface. When the surface of the current collector is roughened, an interlayer having a uniform thickness may not be formed. In such a case, the thickness of the interlayer is converted to a thickness to be obtained when the interlayer is deposited on a smooth substrate surface as described above.

The surface of the interlayer in contact with the thin film is preferably roughened. With this roughened surface, the adhesion between the interlayer and the active material thin film is further improved. The surface of the interlayer can be roughened in correspondence with a roughened surface of the current collector. In other words, the surface of the current collector is roughened, and the interlayer is formed on the current collector so that the surface of the interlayer is roughened in correspondence with the surface of the current collector.

The roughened surface of the current collector preferably has a surface roughness Ra of about 0.01 to 2 $\mu$m, more preferably 0.1 $\mu$m or more, further more preferably about 0.1 to 2 $\mu$m. The surface roughness Ra is defined in Japan Industrial Standards (JIS B 0601-1994) and can be measured with a surface roughness meter, for example.

According to the present invention, preferably, the thin film is divided into columns by gaps formed in its thickness direction, and the columnar portions are adhered to the interlayer at their bottoms.

The thin film composed of active material capable of lithium storage and release according to the present invention is preferably a material storing lithium by being alloyed with lithium. Examples of such a material include silicon, germanium, tin, lead, zinc, magnesium, sodium, aluminum, potassium and indium. Among them, silicon and germanium are preferably used due to their large theoretical capacity. Therefore, the active material thin film used in the present invention is preferably a thin film containing silicon or germanium as a main component.

Preferably, the active material thin film is a substantially amorphous or microcrystalline thin film.

Examples of the material of the current collector used in the present invention include copper (Cu), nickel (Ni), stainless steel and tantalum (Ta). The current collector is preferably thin, and therefore preferably in the form of metal foil. The current collector is preferably made of a material which is not alloyed with lithium. Copper (Cu) is especially preferable as the current collector. Thus, current collector is preferably copper foil. As described above, the surface of the current collector is preferably roughened. In consideration of the above, electrolytic copper foil is preferably used because the surface of such foil is roughened. Alternatively, surface-roughened metal foil such as nickel foil with a copper-containing layer formed thereon may be preferably used.

The method for producing an electrode for a lithium secondary battery of the present invention includes the steps of: forming an interlayer containing Mo or W on a current collector; and depositing a thin film composed of active material capable of lithium storage and release on the interlayer.

The interlayer may be formed by a vapor evaporation method, a CVD method, a sputtering method, a plating method or the like, for example.

The active material thin film may be formed by an sputtering method, a CVD method, a vapor evaporation method, a spraying method, a plating method or the like.

In the active material thin film according to the present invention, preferably, gaps are formed in the thickness direction due to volume expansion and shrinkage of the active material with charge-discharge reaction, and the thin film is divided into columns. By dividing into columns due to gaps formed in the thickness direction, spaces are formed around the columnar portions. Therefore, these spaces can accommodate volume expansion and shrinkage with charge-discharge reaction, generation of stress in the thin film can be prevented. This makes it possible to prevent pulverization of the thin film and separation of the thin film from the current collector, and thus improve the charge-discharge cycle characteristics.

The gaps described above are preferably formed toward valleys of the irregularities on the surface of the interlayer in the case that the surface of the interlayer is roughened.

The active material thin film according to the present invention may be made up of a sequence of superimposed layers. The respective layers may differ in composition, crystallinity, element or impurity concentration or the like from one another. Alternatively, the thin film may have a graded structure in the thickness direction. For example, the thin film may have a graded structure varying composition, crystallinity, element or impurity concentration or the like in the thickness direction.

Lithium may previously be stored in or added to the active material thin film according to the present invention. Lithium may be added to the thin film at the time of forming the thin film. In other words, lithium may be added to the thin film by forming a lithium-containing thin film. Alternatively, lithium may be stored in or added to the thin film after forming the thin film. As a method which lithium is stored in or added to the thin film, an electrochemical method may be employed.

The thickness of the active material thin film is not specifically limited, but may be 20 $\mu$m or less, for example. For obtaining a larger charge-discharge capacity, the thickness is preferably 1 $\mu$m or more.

The lithium secondary battery of the present invention includes a negative electrode made of the electrode of the present invention described above, a positive electrode and a nonaqueous electrolyte.

The solvent of the electrolyte used for the lithium secondary battery of the present invention is not specifically limited, but an example of such a solvent is a mixed solvent of a cyclic carbonate such as ethylene carbonate, propylene carbonate, butylene carbonate and vinylene carbonate, and a chain carbonate such as dimethyl carbonate, methylethyl carbonate and diethyl carbonate. Another example is a mixed solvent of a cyclic carbonate described above with an ether solvent such as 1,2-dimethoxyethane or 1,2-diethoxyethane, or with a chain ester such as γ-butyrolactone, sulfolane or methyl acetate. Examples of a solute of the electrolyte include $LiPF_6$, $LiBF_4$, $LiCF_3SO_3$, $LiN(CF_3SO_2)_2 LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Examples of the electrolyte include gel polymer electrolyte made of a polymer electrolyte such as polyethylene oxide, polyacrylonitrile and polyvinylidene fluoride impregnated with an electrolyte solution, and an inorganic solid electrolyte such as LiI and $Li_3N$. Any electrolyte can be used for the lithium secondary battery of the present invention without limitation as long as a Li compound as the solute developing ion conductivity and the solvent dissolving and retaining the compound are not decomposed under a voltage during charge, discharge or storage of the battery.

Examples of the positive electrode active material of the lithium secondary battery of the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$ and lithium-free metal oxides such as $MnO_2$. Any other materials can also be used without limitation as long as they can insert and deinsert lithium electrochemically.

DESCRIPTION OF THE PREFERRED EMBODIMENTS

Hereinafter, the present invention will be described in more detail by way of example. Note that the present invention is not restricted to the examples to follow, but any appropriate modification is possible as long as the scope of the invention is not changed.

(Experiment 1)
[Production of Electrodes a1 and a2]

An Mo layer and a W layer having a thickness of 0.1 μm as an interlayer were respectively formed on the roughened surface of the electrolytic copper foil (thickness: 18 μm) having a surface roughness Ra of 0.188 μm in an argon (Ar) atmosphere by RF sputtering. The thin film formation was performed under the conditions of an RF power of 200 W, an Ar gas flow of 60 sccm, a chamber inner pressure of 0.1 Pa, and room temperature (not heated) as the substrate temperature.

Thereafter, a microcrystalline silicon thin film was formed on each of the Mo layer and the W layer by a CVD method, using silane ($SiH_4$) gas as the material gas and hydrogen gas as the carrier gas. The thin film formation was performed under the conditions of an $SiH_4$ flow of 10 sccm, an $H_2$ gas flow of 200 sccm, a substrate temperature of 180° C., a reaction pressure of 40 Pa, and an RF power of 555W.

The microcrystalline silicon thin film was deposited to a thickness of 2 μm under the above conditions, and the resultant silicon thin film was cut into a 2 cm×2 cm piece together with the electrolytic copper foil, to obtain an electrode a1 formed on the Mo interlayer and an electrode a2 formed on the W interlayer.

[Production of Electrode b1]

An electrode b1 was produced in the same manner of the electrodes a1 and a2 described above, except that a microcrystalline silicon thin film was directly formed on the roughened surface of the above-mentioned electrolytic copper foil with no Mo or W layer therebetween.

[Electron Microscopic Observation of Electrode]

Figure 1:
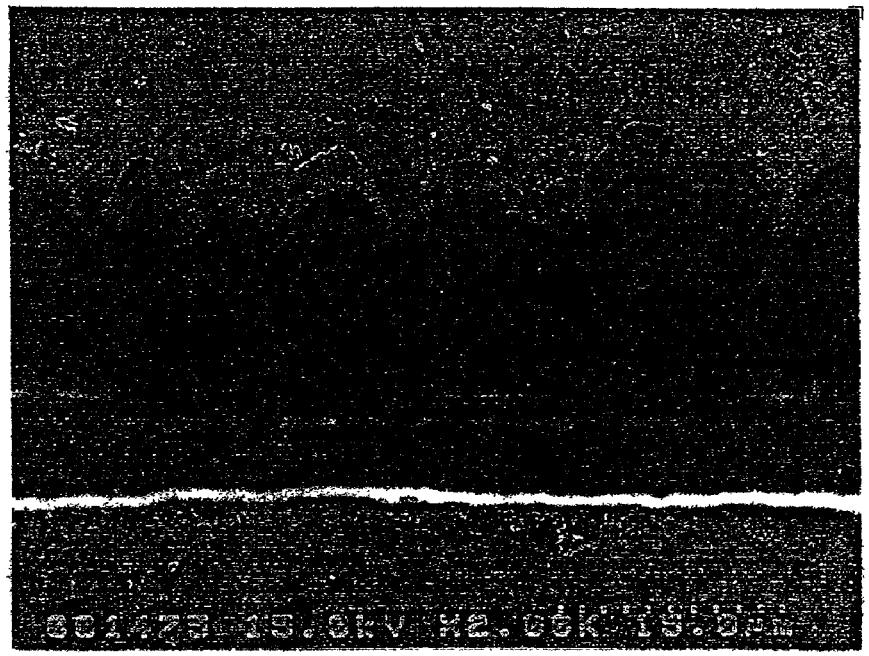
FIG. 1 is a scanning electron micrograph of a cross section of an electrode a1 of the present invention (magnification 2000×).
Figure 2:
FIG. 2 is a scanning electron micrograph of a cross section of the electrode a1 of the present invention (magnification 1000×).
Figure 3:
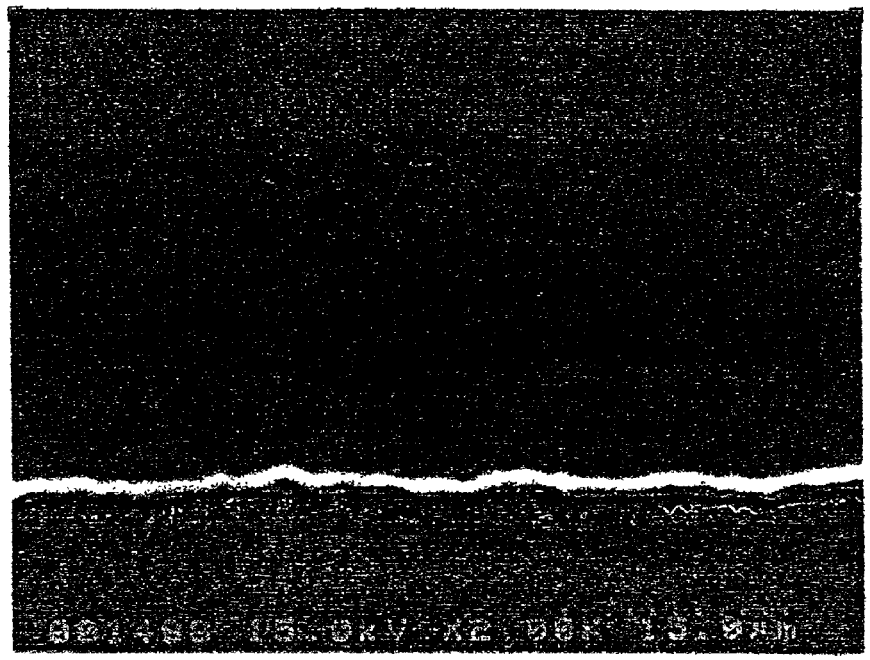
FIG. 3 is a scanning electron micrograph of a cross section of an electrode a2 of the present invention (magnification 2000×).
Figure 4:
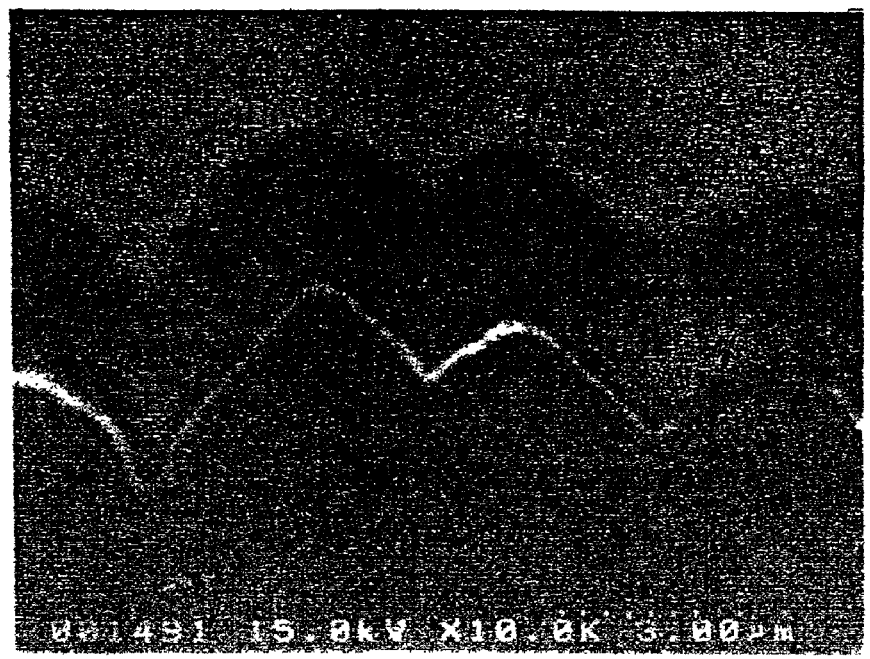
FIG. 4 is a scanning electron micrograph of a cross section of the electrode a2 of the Comparative Example (magnification 1000×).
Figure 5:
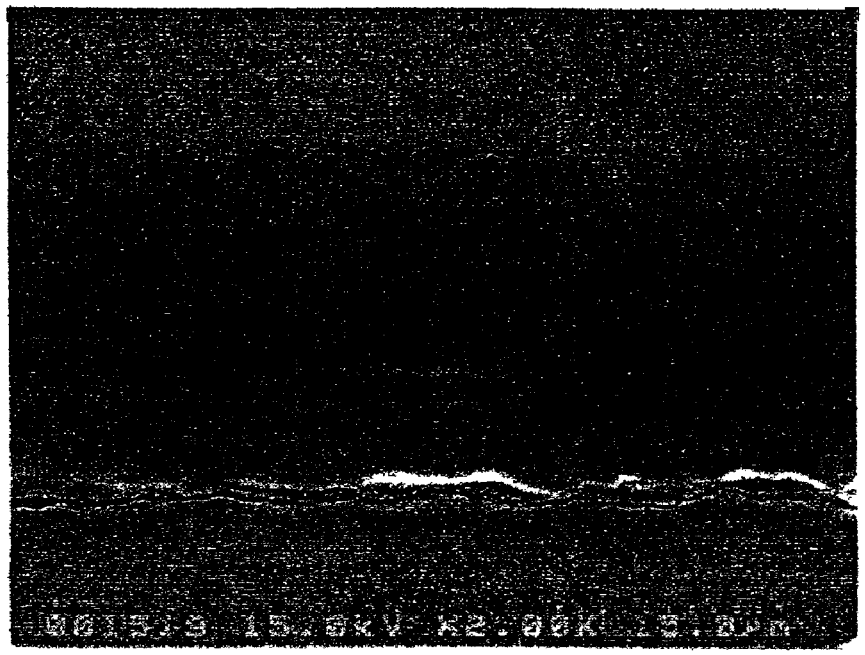
FIG. 5 is a scanning electron micrograph of a cross section of an electrode b1 of the Comparative Example (magnification 2000×).
Figure 6:
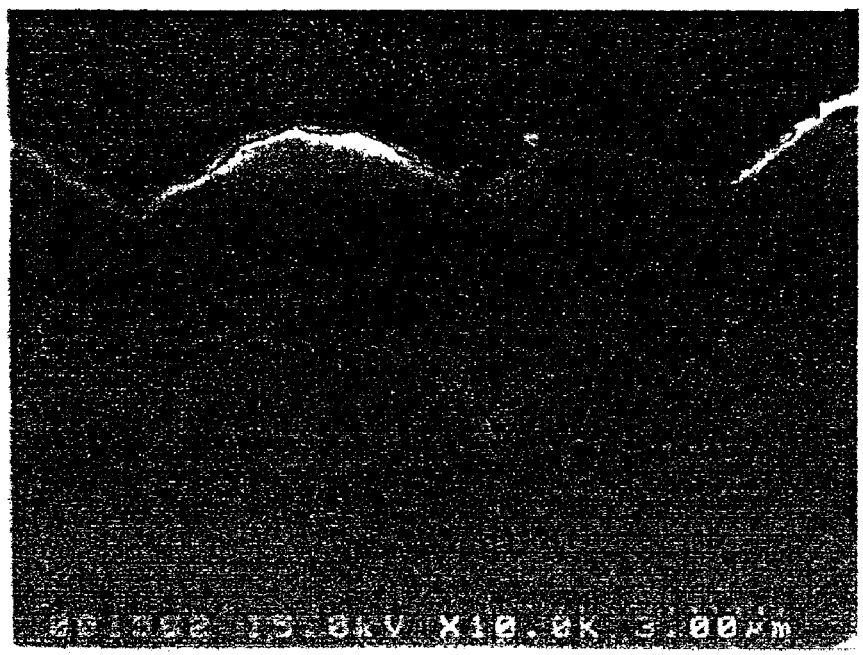
FIG. 6 is a scanning electron micrograph of a cross section of the electrode b1 of the present invention (magnification 1000×).

The electrodes a1, a2 and b1 before assembly into test cells were observed with a scanning electron microscope. FIGS. 1 and 2 are scanning electron micrographs (secondary electron images) of a cross section of the electrode a1. FIGS. 3 and 4 are scanning electron micrographs (secondary electron images) of a cross section of the electrode a2. FIGS. 5 and 6 are scanning electron micrographs (secondary electron images) of a cross section of the electrode b1. The magnification is 2000×for FIGS. 1, 3 and 5, while it is 10000×for FIGS. 2, 4 and 6.

Each sample observed was prepared by covering the electrode with resin and slicing the resultant electrode. The dark region observed in the upper portion of each of FIGS. 1 to 6 corresponds to the resin cover layer. In FIGS. 1 to 6, a slightly bright lower portion corresponds to the copper foil, and a somewhat dark portion above the copper foil corresponds to the silicon thin film (thickness: about 2 μm). In FIGS. 1 to 4, a very thin bright portion is recognized between the copper foil and the silicon thin film. This is the Mo or W layer as the interlayer.

As is shown in FIGS. 1 to 4, in which the silicon thin film is formed on the copper foil with the Mo or W layer as the interlayer therebetween, the silicon thin film is homogeneous with no particular abnormality recognized in the interface portion of the silicon thin film. On the contrary, as is shown in FIGS. 5 and 6, in which the silicon thin film is directly formed on the copper foil with no interlayer therebetween, heterogenous portions are observed as somewhat bright portions in the silicon thin film at positions near the interface with the copper foil. It is considered that these portions were formed by excessive diffusion of copper into the silicon thin film. Therefore, it is found that diffusion of the current collector component into the silicon thin film can be suppressed by providing the Mo or W layer as the interlayer between the current collector and the silicon thin film.

[Measurement of Charge-discharge Cycle Characteristics]

Test cells were produced using the above-mentioned electrodes a1, a2 and b1 respectively as the working electrode, and metal lithium as the counter electrode and the reference electrode. As the electrolyte, an electrolyte obtained by dissolving 1 mol/liter of $LiPF_6$ in a mixed solvent containing equi-volumes of ethylene carbonate and diethyl carbonate was used. Note that in the single electrode test cells, reduction of the working electrode is referred to as charge, while oxidation thereof is referred to as discharge.

The test cells were charged at a constant current of 2 mA at 25° C. until the potential with the reference electrode as a standard reaches 0 V and then discharged at a constant current of 2 mA at 25° C. until the potential reaches 2 V. The one cycle of charge and discharge was repeated, and the capacity retention rate at each of the first to sixth cycles was measured. The capacity retention rate is a value defined by the equation below. The results are shown in Table 1 and FIG. 7

Capacity retention rate (%)=discharge capacity at each cycle/discharge capacity at the first cycle)×100

TABLE 1

| Cycle Number | 1 | 2 | 3 | 4 | 5 | 6 |
|---|---|---|---|---|---|---|
| Capacity Retention Rate (%) | | | | | | |
| Electrode a1 | 100 | 105 | 108 | 108 | 109 | 107 |
| Electrode a2 | 100 | 102 | 104 | 104 | 105 | 104 |
| Electrode b1 | 100 | 112 | 106 | 113 | 114 | 116 |

Figure 7:
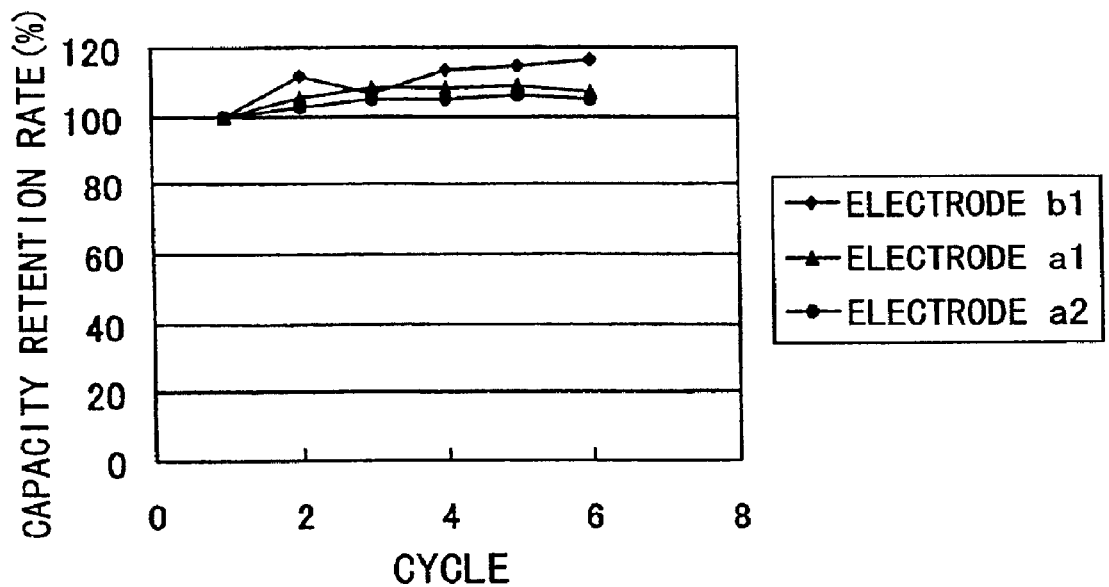
FIG. 7 is a view showing the charge-discharge cycle characteristics of electrodes of examples of the present invention.

As is apparent from Table 1 and FIG. 7, the test cells using the electrodes a1 and a2 exhibit cycle characteristics roughly equal to that of the test cell using the electrode b1. This indicates that the electrode having the Mo or W layer as the interlayer can exhibit adhesion roughly equal to that of the electrode having no interlayer, in addition to suppressing diffusion of copper into the silicon thin film.

In addition, it was confirmed that the entire electrode b1 had been embrittled due to a reaction product generated near the interface between the current collector and the silicon thin film, and thus the electrode b1 was inferior in durability as an electrode for a battery to the electrodes a1 and a2. Accordingly, it is found that by providing an interlayer between the current collector and the active material thin film according to the present invention, it is possible to suppress reaction and diffusion at the interface between the current collector and the active material thin film appropriately, and thus provide an electrode for a lithium secondary battery excellent in charge-discharge cycle characteristics and durability. It is confirmed that such an effect is obtained even when the interlayer is further thinned to about 0.01 μm and does not cover the surface of the current collector completely but exists like islands on the surface of the current collector.

The electrodes a1 and a2 after the charge-discharge cycles were observed with a scanning electron microscope. As a result, it was confirmed that gaps were formed in the entire thin film in the thickness direction originating from valleys of the rough surface of the thin film, and the thin film was divided into columns by these gaps.

(Experiment 2)
[Production of Electrodes c1 and c2]

An Mo layer and a W layer as the interlayer were respectively formed on rolled copper foil (thickness: 18 μm) having a surface roughness Ra of 0.037 m under the same conditions as those in the formation of the electrodes a1 and a2.

Thereafter, a microcrystalline silicon thin film was formed on each of the Mo and W layers under the same conditions as those in the formation of the electrodes a1 and a2. The resultant silicon thin film was cut into a 2 cm×2 cm piece together with the rolled copper foil, to obtain an electrode c1 with the Mo interlayer and an electrode c2 with the W interlayer.

[Production of Electrode d1]

An electrode d1 was produced in the same manner of the electrodes c1 and c2, except that a microcrystalline silicon thin film was directly formed on the rolled copper foil with no Mo or W layer therebetween.

[Measurement of Charge-discharge Cycle Characteristics]

Using the electrodes c1, c2 and d1 respectively as the working electrode, the charge-discharge cycle characteristics was measured as in Experiment 1 described above. The results are shown in Table 2 and FIG. 8.

Figure 8:
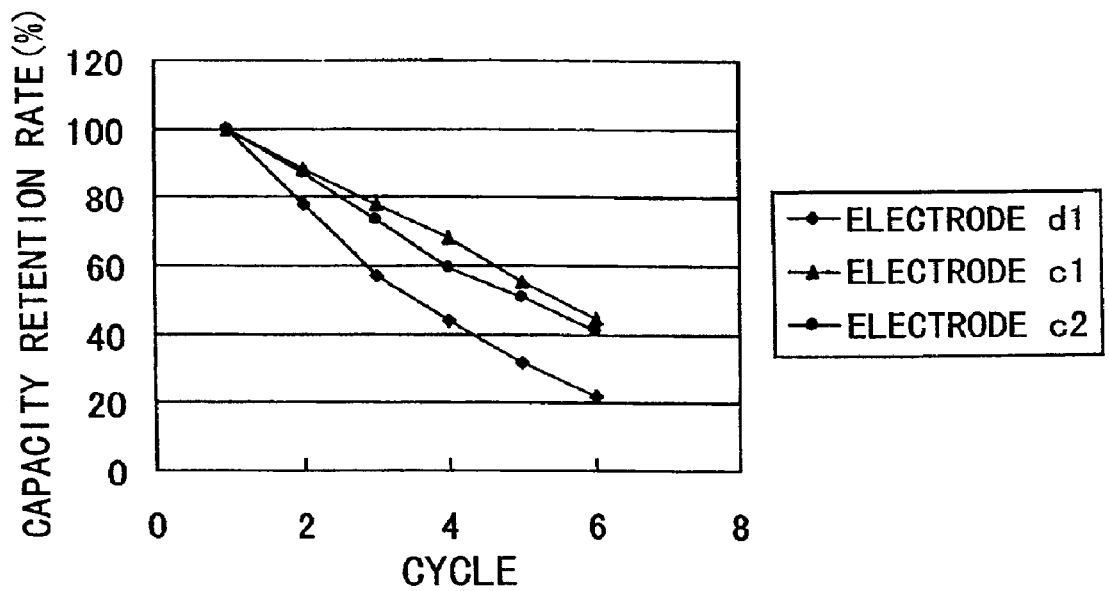
FIG. 8 is a view showing the charge-discharge cycle characteristics of electrodes of examples of the present invention.

As is shown in Table 2 and FIG. 8, while the cycle characteristics of test cells using the electrodes c1 and c2 are superior to that of a test cell using the electrode d1, they are significantly inferior to those of the electrodes a1, a2 and b1 in Experiment 1. The result indicates that while the charge-discharge characteristics can be improved by using the Mo or W layer as the interlayer, the charge-discharge cycle characteristics can further be improved when the surfaces of the interlayer and the current collector are roughened.

In addition, it was confirmed that the entire electrode d1 had been embrittled due to a reaction product generated near the interface between the current collector and the silicon thin film, and thus the electrode d1 was inferior in durability as an electrode for a battery. The embrittlement was more significant than that observed in the electrode b1. Actually, the electrode was cracked only by being slightly deformed.

TABLE 2

| Cycle Number | 1 | 2 | 3 | 4 | 5 | 6 |
|---|---|---|---|---|---|---|
| Capacity Retention Rate (%) | | | | | | |
| Electrode c1 | 100 | 88 | 78 | 68 | 55 | 44 |
| Electrode c2 | 100 | 87 | 73 | 59 | 51 | 41 |
| Electrode d1 | 100 | 78 | 57 | 44 | 32 | 22 |

In the above examples, the Mo layer and the W layer were used as the interlayer. Alternatively, substantially the same effect can also be obtained by use of an interlayer made of any of metals Mg, Al, Ti, V, Cr, Mn, Fe, Co, Ni, Zn, Ge, Zr, Nb, Mo, Ru, Ag, In, Sn, Sb, Ta, W and Pb, alloys containing any of these metals as a main component, and oxides, nitrides and carbides of these metals.

According to the present invention, an electrode for a lithium secondary battery capable of controlling diffusion of a current collector component appropriately and exhibiting an excellent charge-discharge cycle characteristics can be obtained.

What is claimed is:

1. An electrode for a lithium secondary battery comprising:

a current collector;

an interlayer containing Mo or W provided on said current collector; and a thin film composed of active material capable of lithium storage and release deposited on said interlayer.

2. The electrode for a lithium secondary battery according to claim 1, wherein said thin film is substantially amorphous or microcrystalline.

3. The electrode for a lithium secondary battery according to claim 1, wherein said thin film includes silicon or germanium as a main component.

4. The electrode for a lithium secondary battery according to claim 1, wherein a surface of said interlayer is roughened.

5. The electrode for a lithium secondary battery according to claim 4, wherein the surface of said interlayer is roughened in correspondence with a roughened surface of said current collector.

6. The electrode for a lithium secondary battery according to claim 1, wherein said current collector includes Cu.

7. A lithium secondary battery comprising a negative electrode made of the electrode according to claim 1, a positive electrode and a nonaqueous electrolyte.

8. A method for producing an electrode for a lithium secondary battery comprising the steps of:

forming an interlayer containing Mo or W on a current collector; and depositing a thin film composed of active material capable of lithium storage and release on said interlayer.

9. The method for producing an electrode for a lithium secondary battery according to claim 8, wherein said interlayer is formed by a vapor evaporation method, a CVD method, a sputtering method or a plating method.

10. The method for producing an electrode for a lithium secondary battery according to claim 8, wherein said thin film is formed by a sputtering method, a CVD method, a vapor evaporation method, a spraying method or a plating method.

11. A lithium secondary battery comprising a negative electrode made of the electrode produced by the method according to claim 8, a positive electrode and a nonaqueous electrolyte.

* * * * *